United States Patent
Skerlj

(10) Patent No.: US 8,117,526 B2
(45) Date of Patent: Feb. 14, 2012

(54) APPARATUS AND METHOD FOR GENERATING A TRANSMIT SIGNAL AND APPARATUS AND METHOD FOR EXTRACTING AN ORIGINAL MESSAGE FROM A RECEIVED SIGNAL

(75) Inventor: Maurizio Skerlj, Munich (DE)

(73) Assignee: Qimonda AG, Munich (DE)

( * ) Notice: Subject to any disclaimer, the term of this patent is extended or adjusted under 35 U.S.C. 154(b) by 1111 days.

(21) Appl. No.: 11/947,557

(22) Filed: Nov. 29, 2007

(65) Prior Publication Data
US 2009/0110109 A1    Apr. 30, 2009

Related U.S. Application Data

(60) Provisional application No. 60/983,239, filed on Oct. 29, 2007.

(51) Int. Cl.
*G06F 11/10* (2006.01)
*H03M 13/00* (2006.01)
(52) U.S. Cl. .................... 714/807; 714/42; 710/124
(58) Field of Classification Search .................. 710/124; 714/42, 752, 758, 807
See application file for complete search history.

(56) References Cited

U.S. PATENT DOCUMENTS

| | | | | |
|---|---|---|---|---|
| 6,584,526 | B1* | 6/2003 | Bogin et al. | 710/124 |
| 7,149,947 | B1* | 12/2006 | MacLellan et al. | 714/758 |
| 7,587,658 | B1* | 9/2009 | Tong et al. | 714/785 |
| 7,676,727 | B2* | 3/2010 | Harter et al. | 714/763 |
| 2003/0233609 | A1* | 12/2003 | Ikonomopoulos et al. | 714/758 |
| 2004/0113891 | A1* | 6/2004 | Lee | 345/169 |
| 2005/0273689 | A1* | 12/2005 | Barthel et al. | 714/758 |
| 2009/0006899 | A1* | 1/2009 | Gara et al. | 714/42 |

* cited by examiner

*Primary Examiner* — Sam Rizk
(74) *Attorney, Agent, or Firm* — John S. Economou

(57) ABSTRACT

A method for extracting an original message from a received signal including data bits representing the original message or an inverted version thereof, an indicator indicating whether the data bits represent the original message or the inverted version thereof, and a check information which depends on the data bits and the indicator, the method including determining a check information based on the received data bits and the received indicator, comparing the determined check information with the received check information and extracting the original message based on the result of the comparison.

25 Claims, 10 Drawing Sheets

BL = 4

| Burst Length | Starting Address (A1 A0) | Sequential Addressing (decimal) | Interleave Addressing (decimal) |
|---|---|---|---|
| 4 | 00 | 0, 1, 2, 3 | 0, 1, 2, 3 |
| | 01 | 1, 2, 3, 0 | 1, 0, 3, 2 |
| | 10 | 2, 3, 0, 1 | 2, 3, 0, 1 |
| | 11 | 3, 0, 1, 2 | 3, 2, 1, 0 |

BL = 8

| Burst Length | Starting Address (A2 A1 A0) | Sequential Addressing (decimal) | Interleave Addressing (decimal) |
|---|---|---|---|
| 8 | 000 | 0, 1, 2, 3, 4, 5, 6, 7 | 0, 1, 2, 3, 4, 5, 6, 7 |
| | 001 | 1, 2, 3, 0, 5, 6, 7, 4 | 1, 0, 3, 2, 5, 4, 7, 6 |
| | 010 | 2, 3, 0, 1, 6, 7, 4, 5 | 2, 3, 0, 1, 6, 7, 4, 5 |
| | 011 | 3, 0, 1, 2, 7, 4, 5, 6 | 3, 2, 1, 0, 7, 6, 5, 4 |
| | 100 | 4, 5, 6, 7, 0, 1, 2, 3 | 4, 5, 6, 7, 0, 1, 2, 3 |
| | 101 | 5, 6, 7, 4, 1, 2, 3, 0 | 5, 4, 7, 6, 1, 0, 3, 2 |
| | 110 | 6, 7, 4, 5, 2, 3, 0, 1 | 6, 7, 4, 5, 2, 3, 0, 1 |
| | 111 | 7, 4, 5, 6, 3, 0, 1, 2 | 7, 6, 5, 4, 3, 2, 1, 0 |

FIG 8

| Data | 64 bit | 64 bit | 64 bit | 64 bit |
|---|---|---|---|---|
| ECC | 4 bit | 4 bit | 4 bit | 4 bit |
| Parity | 1 bit | 1 bit | 1 bit | 1 bit |
| Inversion | 3 bit | 3 bit | 3 bit | 3 bit |

FIG 9

| data | $\vec{m}_1$ | $\vec{m}_2$ | $\vec{m}_3$ | $\vec{m}_4$ |
|---|---|---|---|---|
| checksum | $\vec{c}_1$ | $\vec{c}_2$ | $\vec{c}_3$ | $\vec{c}_4$ |
| parity | $p_1$ | $p_2$ | $p_3$ | $p_4$ |
| inversion signaling | $\vec{b}_1$ | $\vec{b}_2$ | $\vec{b}_3$ | $\vec{b}_4$ |

FIG 10

| $p_1$ | $p_2$ | s | |
|---|---|---|---|
| 0 | 0 | 0 | No errors detected |
| 0 | 0 | >0 | 4 or more errors detected: don´t decode |
| 0 | 1 | 0 | Error hit the parity bit $p_2$, $(\vec{m}_1, \vec{m}_2)$ error free |
| 1 | 0 | 0 | Error hit the parity bit $p_2$, $(\vec{m}_1, \vec{m}_2)$ error free |
| 0 | 1 | >0 | Single correctable error on $(\vec{m}_1, \vec{m}_2)$ |
| 1 | 0 | >0 | Single correctable error on $(\vec{m}_1, \vec{m}_2)$ |
| 1 | 1 | 0 | Single error on both $\vec{m}_1$ and $\vec{m}_2$: don´t decode |
| 1 | 1 | >0 | Double error detected on both $\vec{m}_1$ and $\vec{m}_2$: don´t decode |

FIG 11

APPARATUS AND METHOD FOR GENERATING A TRANSMIT SIGNAL AND APPARATUS AND METHOD FOR EXTRACTING AN ORIGINAL MESSAGE FROM A RECEIVED SIGNAL

This application claims the benefit of U.S. Provisional Application No. 60/983,239, filed on Oct. 29, 2007, entitled "Method and Apparatus for Generating a Transmit Signal," which application is hereby incorporated herein by reference.

TECHNICAL FIELD

Embodiments of the present invention generally relate to signal transmission and, in particular, to apparatuses and methods for data bus inversion.

BACKGROUND

Data bus inversion is known to be an important aspect of bus power management and electrical reliability. Data bus inversion can aid bus power management by guarantying that no more than 50% of data bus lines carrying data bits need to change state, i.e., change state between "0" and "1" or "1" and "0", at any time. If the data bus is, e.g., 64 bits wide, any binary number can be represented on the data bus from 0 to $2^{64}-1$. When sending 64 bit message words on the data bus, state changes of certain bus lines will occur between succeeding message words. If it is encountered that more than half of the bus lines would need to have a change state from one message word to the next, the next message word can be inverted. Thus, every logical "1" becomes a logical "0", and every logical "0" becomes a logical "1".

An error correction code (ECC) can be used in order to recover from single or multiple errors due to transmission over noisy channels.

SUMMARY OF THE INVENTION

An embodiment of the present invention provides an apparatus for generating a transmit signal comprising data bits, the apparatus comprising a circuit for providing an indicator indicating whether the data bits represent an original message or an inverted version thereof, a processor for determining check information which depends on the data bits and the indicator, and a transmitter for transmitting the transmit signal including the data bits, the indicator and at least a part of the check information.

A further embodiment of the present invention provides an apparatus for extracting an original message from a received signal carrying information on data bits representing the original message or an inverted version thereof. An indicator indicates whether the data bits represent the original message or the inverted version thereof, and a check information which depends on the data bits and the indicator. The apparatus includes a processor for determining a check information based on the received data bits and the received indicator. A circuit compares the determined check information with the received check information, and an extractor extracts the original message based on the result of the comparison.

BRIEF DESCRIPTION OF THE DRAWINGS

In the following, embodiments of the present invention are explained in more detail with reference to the accompanying drawings, in which:

FIG. 8 shows exemplarily the structures for DDR2 as DRAM;

FIG. 9 shows a burst packet format according to an embodiment of the present invention;

FIG. 10 shows a burst packet format according to an embodiment of the present invention; and FIG. 11 shows a decoding scheme according to an embodiment of the present invention.

DETAILED DESCRIPTION OF ILLUSTRATIVE EMBODIMENTS

Figure 1:
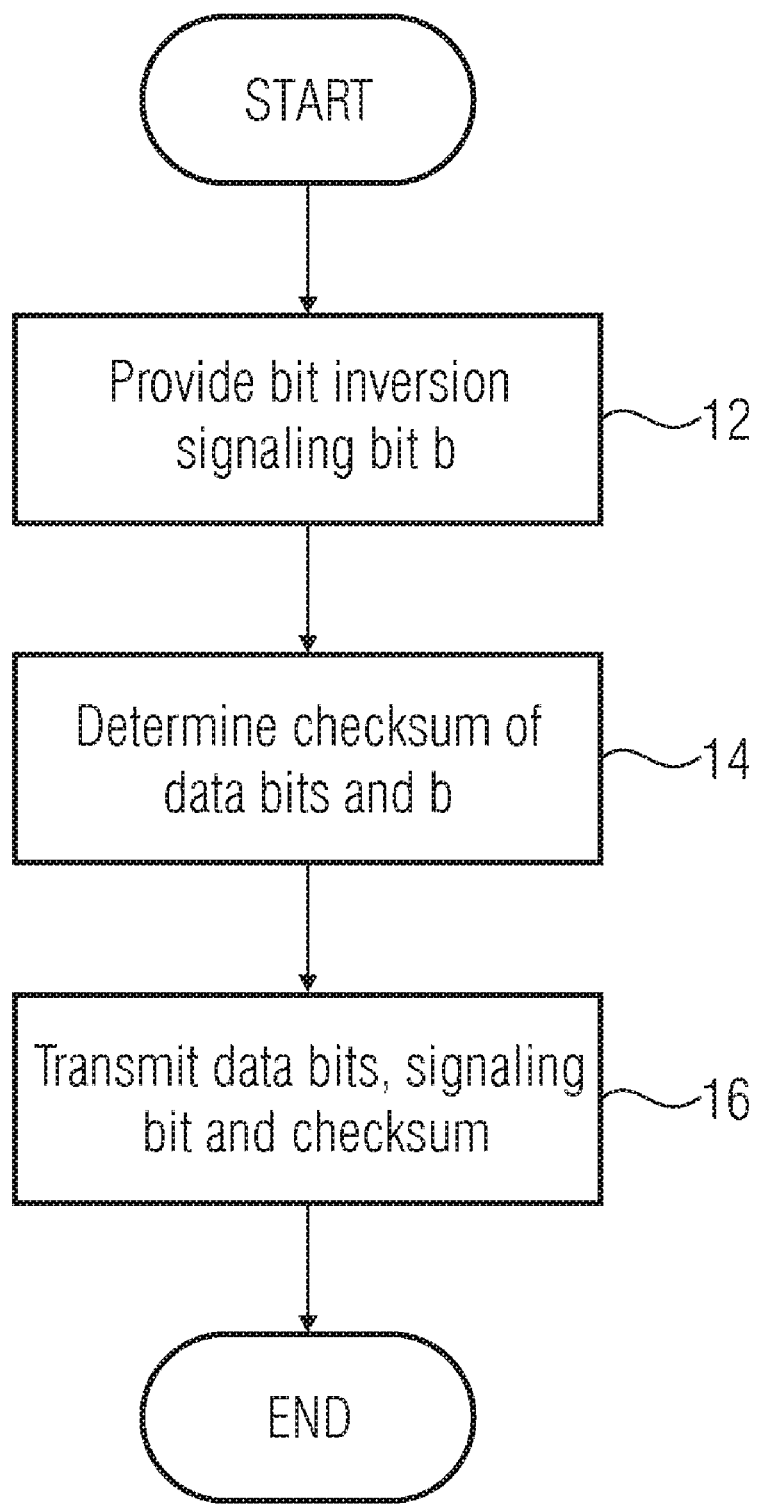
FIG. 1 shows a flow chart of a method for generating a transmit signal according to an embodiment of the present invention.

With regard to the following description it should be noted, that in the different embodiments equal or equally operating functional elements of the same reference numerals in the description of those functional elements are interchangeable in the different embodiments are illustrated in the following.

Throughout this specification bold lower case letters, e.g., m, denote vectors comprising one or more vector-components, and bold capital letters, e.g., G, denote matrices comprising one or more lines and columns of matrix entries.

Embodiments of the present invention provide a concept which protects one or more inversion signaling bits with ECC. This may be achieved by using the linearity of ECC codes. The one or more inversion signaling bits can be error protected and the ECC calculation on an original message m can be done in parallel.

FIG. 1 shows the flow chart of a method for generating a transmit signal t according to an embodiment of the present invention.

The transmit signal t comprises data bits d, wherein the data bits d represent an original message m or an inverted version thereof. In data bus inversion techniques, the original message m is conditionally inverted based on a matrix, i.e., minimize the data bus activity or minimize the frequency of symbols that consume more power in bus line terminations. In a first step 12 an indicator is provided, wherein the indicator indicates whether the data bits d represent the original message m or an inverted version thereof. According to an embodiment of the present invention the indicator may be an inversion signaling bit b or an inversion signaling vector b comprising a plurality of inversion signaling bits each referring to a different part of the original message word m. After the provision of the indicator in step 12 check information which depends on the data bits d and the indicator is determined in step 14. According to an embodiment of the present invention the check information may be a parity bit or a checksum comprising a plurality of ECC bits. Having determined the check information the transmit signal t is formed in step 16, wherein the transmit signal t includes the data bits d, the indicator and at least a part of the check information.

Figure 2:
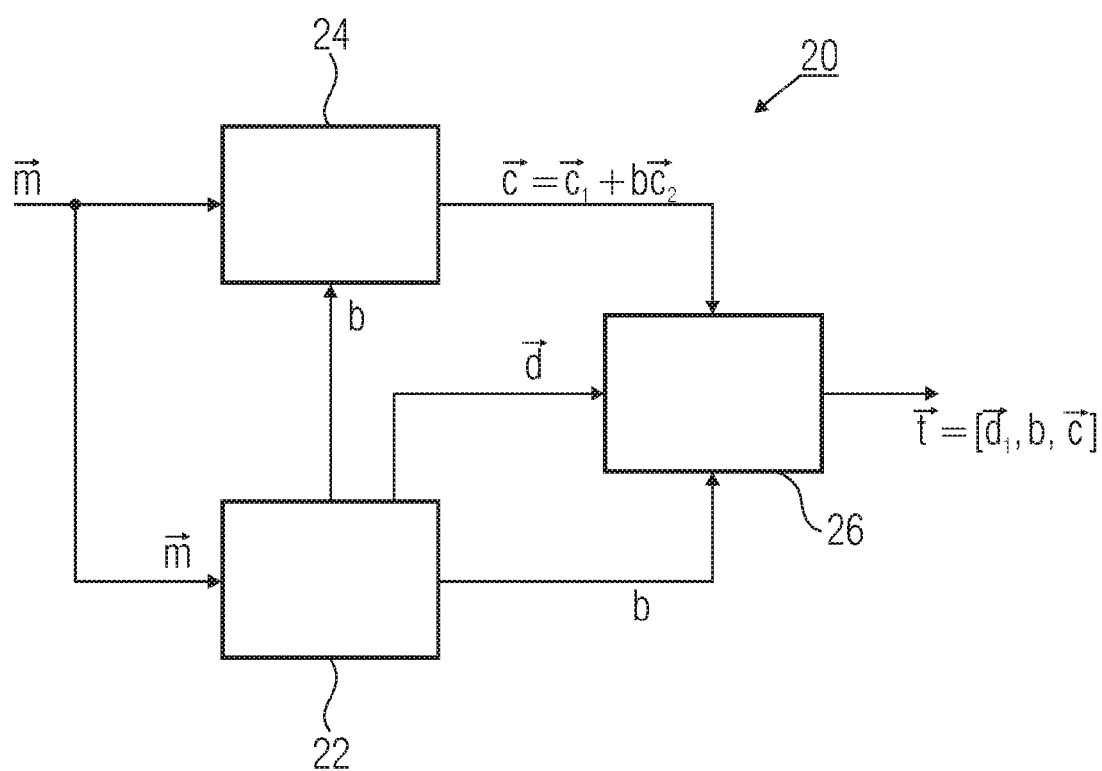
FIG. 2 shows a block diagram of an apparatus for generating a transmit signal according to a further embodiment of the present invention.

A block diagram of an apparatus 20 for generating the transmit signal t comprising the data bits d according to the method described referring to FIG. 1 is schematically shown in FIG. 2.

The apparatus 20, which may, e.g., be a memory controller, obtains the original message word m as input. A circuit 22 for providing the indicator in the form of an inversion signaling bit b processes the original message word m in order to check whether the bits of the original message word m have to be inverted or not. The circuit 22 outputs the indicator b and the data bits d which represent the original message m or the inverted version thereof in case the original message m has to be inverted. Together with the original message m the indicator b is input to a processor 24 for determining the check information c which depends on both the original message m and the indicator b. At the same time it can also be said, that the check information c depends on both the data bits b and the indicator b. This dependence will be explained in further detail below. In a transmitter 26 for transmitting the transmit signal t the data bits d, the indicator b and the check information c are combined to form the transmit signal t. According to embodiments, the apparatus 20 is capable of being coupled to a plurality of channels via which the data bits of the transmit signal are to be transmitted simultaneously in parallel, e.g., the signal lines of a memory bus.

In the following the functionality of the apparatus 20 and, in particular, of the processor 24 will be described in more detail.

For the sake of simplicity it is now assumed that the data bus inversion is performed on the whole original message word m. The case of inverting chunks of m will lead to more inversion signaling bits and the described concept can be easily generalized.

By using the linearity of ECC codes the inversion signaling bit b can be error protected and still the ECC calculation on the original message m can be done temporarily in parallel.

Figure 3:
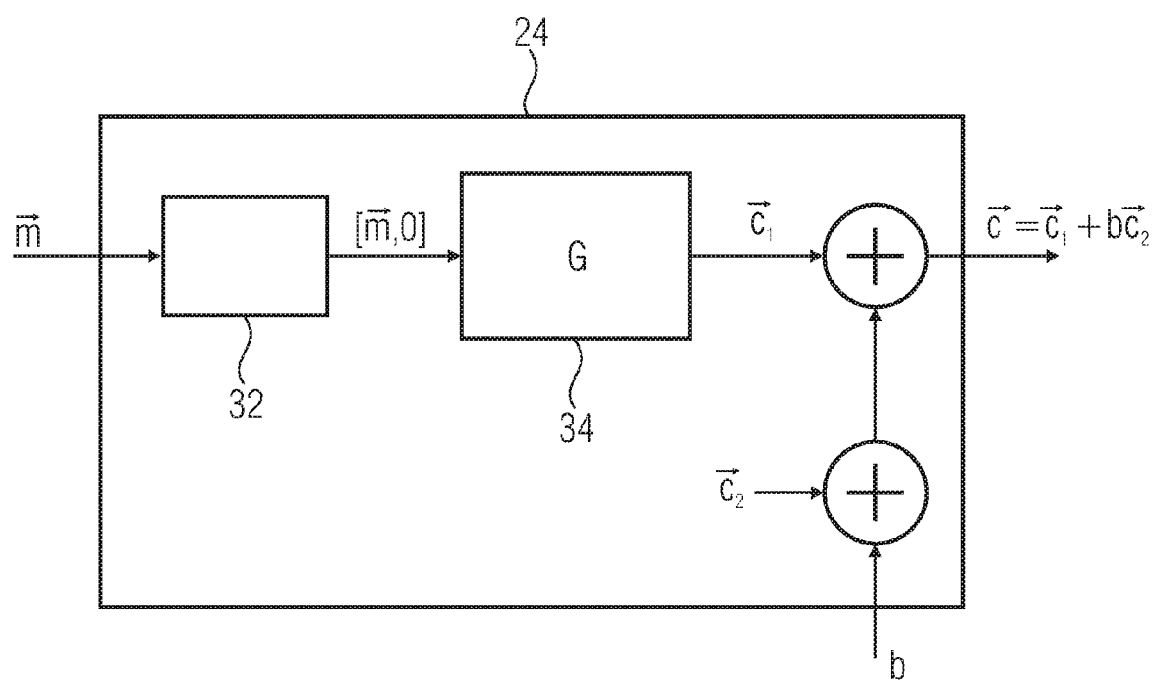
FIG. 3 shows a block diagram of an apparatus for generating a transmit signal according to yet a further embodiment of the present invention.

Referring now to FIG. 3 a more detailed block diagram of the processor 24 is shown.

The processor 24 comprises a circuit 32 to extend the original message m by at least one bit value indicating no inversion of the original message to obtain an extended original message m'. According to an embodiment of the present invention the original message m is, based on the assumption that the bus inversion is performed on the whole original message word m, extended by 0 to obtain the extended original message m'=(m,0). The extended original message m' is then multiplied by a code generator matrix G in a processing block 34 to obtain a first check information $c_1$. For this first check information $c_1$ a first state, e.g., 0, was assumed for the indicator or the signaling bit b. The first check information $c_1$ is then added, e.g., by a modulo-2 addition, to a second predetermined check information $c_2$ multiplied by the value of the indicator b to obtain the check information c. As can be seen, the second predefined check information $c_2$ is only added to the first check information $c_1$ in case the actual state of the indicator b is different from the first state assumed for obtaining the extended original message m'. In other words, the first check information $c_1$ is obtained when assuming that the signaling bit b indicates no inversion, and the second check information $c_2$ is only added to the first check information $c_1$ in case an inversion of the original message is performed. According to embodiments of the present invention the first and the second check information correspond to ECC checksums obtained by multiplying certain vectors with the code generator matrix G. The first check information $c_1$ is obtained by multiplying the extended original message m' with the code generator matrix G, i.e., $$m \cdot G = (m,0) \cdot G = (m,0,c_1). \qquad (1)$$

The second check information $c_2$ can be obtained by:

$$(1,1) \cdot G = (1,1,c_2). \qquad (2)$$

wherein 1 denotes an all-ones-vector having a length equal to the bit length of the original message m.

The vector (m,0) can be inverted by a modulo-2 addition with the all-ones-vector (1,1). Hence, it can be seen that in case of no inversion, i.e. b=0, the transmit signal is $t=(m,0,c_1)$. In case of an inversion this transmit signal is modified by a modulo-2 addition with $(1,1,c_2)$ leading to $(\overline{m},1,c_1 \oplus c_2)$, wherein $\overline{m}$ denotes the inverted original message word and $\oplus$ denotes the modulo-2 addition. This is due to the linearity of the ECC code, i.e., $$(\overline{m},1) \cdot G = ((m,0) \oplus (1,1)) \cdot G = (m,0) \cdot G \oplus (1,1) \cdot G \qquad (3)$$

Note that $c_2$ is a fixed check information or checksum that can be stored. This means that effectively the ECC encoding and the bus inversion can be done temporarily in parallel and nevertheless the indicator b will be error protected.

Figure 4:
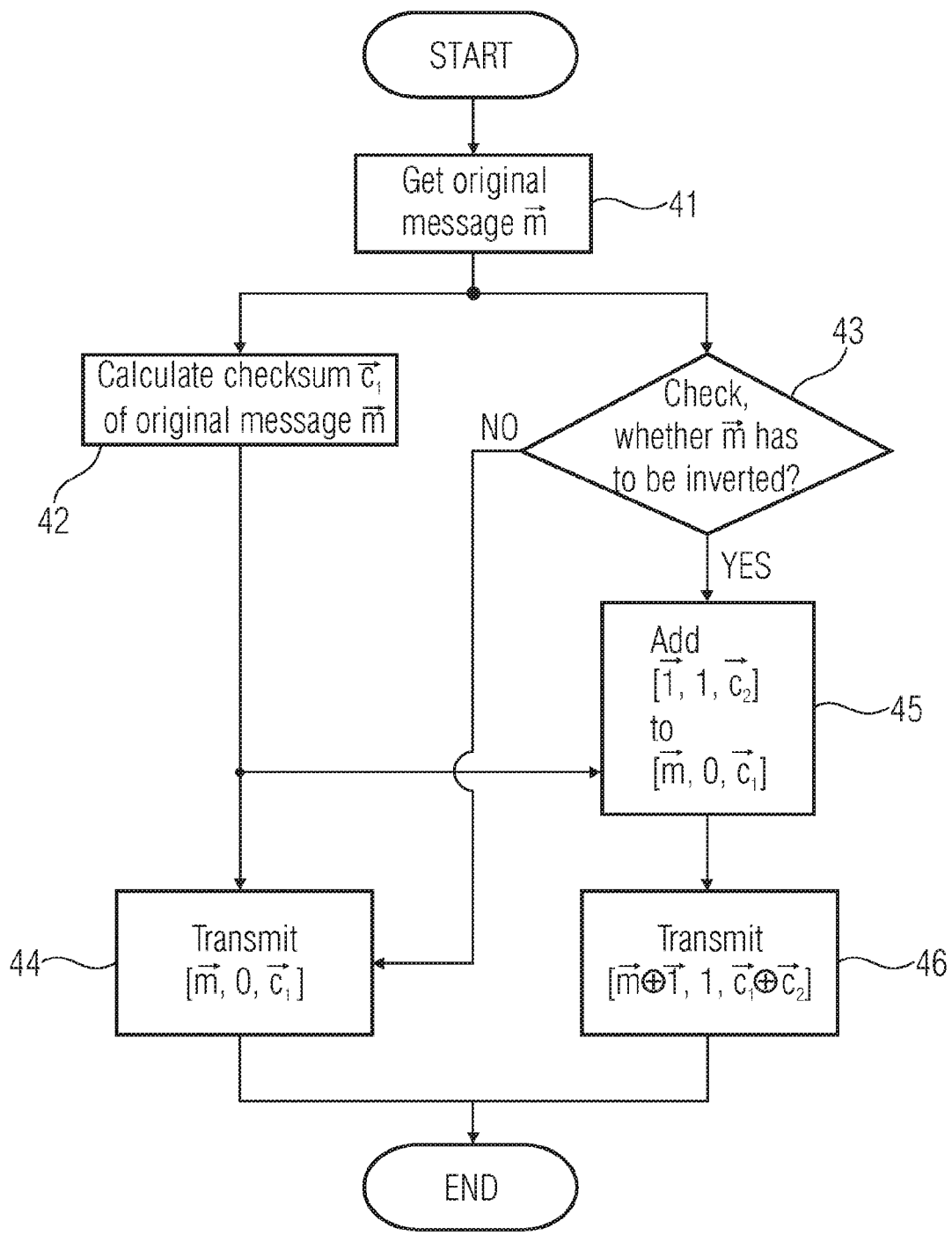
FIG. 4 shows a flow chart of a method for generating a transmit signal according to an embodiment of the present invention.

The algorithm carried out by the apparatus 20, in case the data bus inversion takes place on the whole original message m resulting in only one inversion signaling bit b, can be summarized referring to FIG. 4.

In a first step 41 the original message m is obtained. Then, the first check information $c_1$ of the extended original message m' is determined assuming an inversion signaling bit indicating no inversion, that is e.g. b=0, in a step 42. Temporarily in parallel to step 42 it is checked in a step 43 whether the original message m has to be inverted or not. In case no inversion needs to take place, a transmit signal $t=(m,0,c_1)$ is transmitted in a step 44. On the other hand, if step 43 yields that an inversion has to be performed, a modulo-2 addition of $(1,1,c_2)$ and $(m,0,c_1)$ is performed in a step 45. In a step 46 the result of this modulo-2 addition is transmitted as the transmit signal.

In general, the transmit signal can be computed according to:

$$t = ((m \oplus b \cdot 1), b, (c_1 \oplus b \cdot c_2)). \qquad (4)$$

Figure 5:
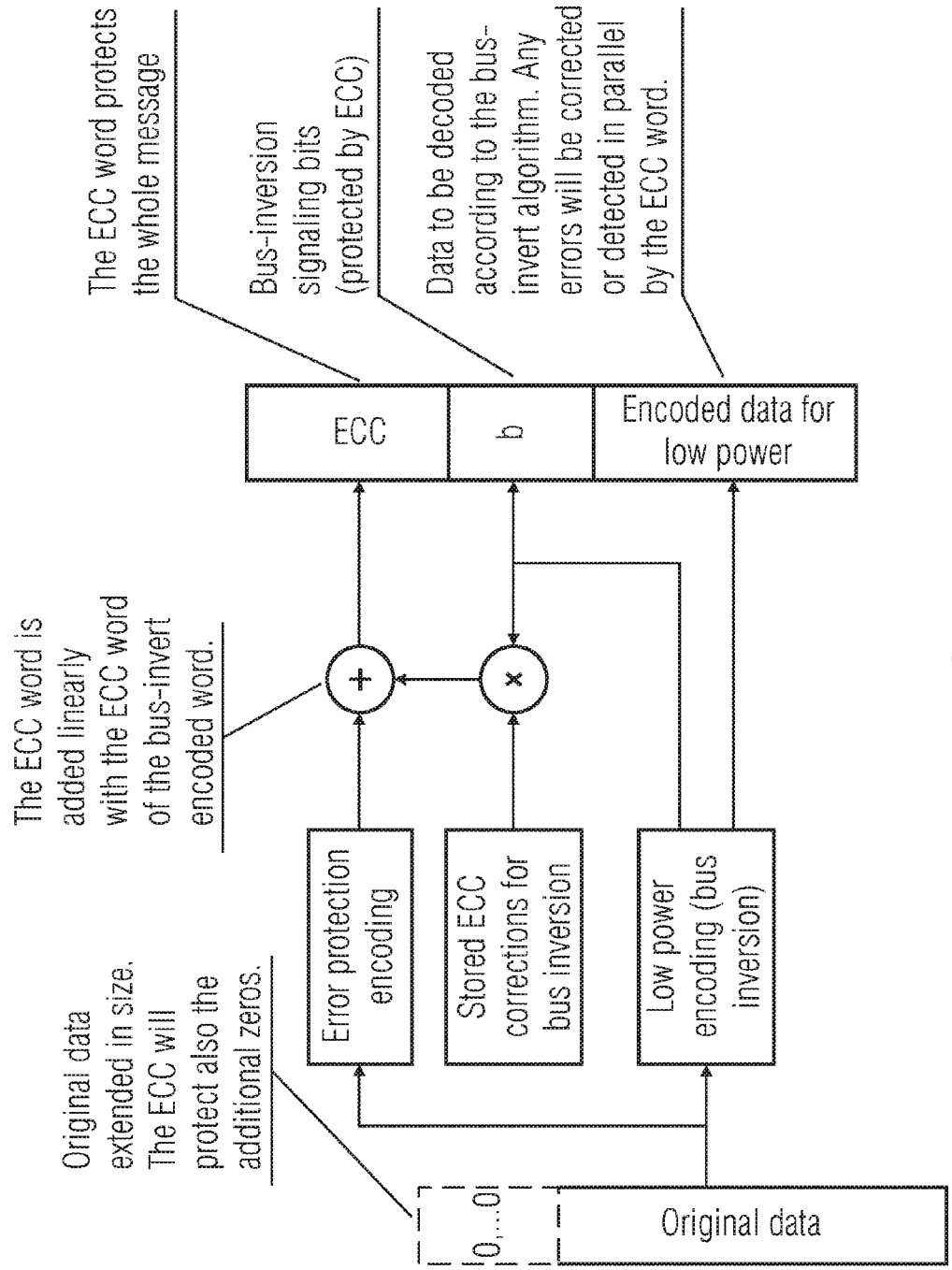
FIG. 5 depicts a concept for generating a transmit signal according to an embodiment of the present invention.

Moreover, a design optimization can be performed in case of data bus inversion of the whole message signal m. If the code generator matrix G is chosen such that $1 \cdot G = 1$, which is true if G is chosen such that the weights of the columns of G are odd, then $(\overline{m},1) \cdot G = (\overline{m},1,\overline{c}_1)$, with $\overline{c}_1$ being the inverted form of the first checksum $c_1$, meaning that data bus inversion of the original message m extended by one position leads to a simple inversion of the encoded message. Hence, in this case only the inversion signaling bit b and the first check information $c_1$ is required to form the transmit signal. If the inversion signaling bit b indicates that an inversion of the original message word m has to be performed, the original message word m and the first checksum $c_1$ are simply inverted. Since in this case the second check information corresponds to an all-ones vector having a length corresponding to the bit length of the first check information $c_1$, it does not need to be precomputed and stored. The above described algorithm or concept is graphically summarized in FIG. 5.

The above described algorithm can easily be extended to a plurality of inversion signaling bits b, which is applied on the original message m in chunks. For this case the apparatus 20 is configured to provide a first indicator for a first portion of the data bits and to provide a second indicator for a second portion of the data bits, and to determine the checksum based on the data bits and the first and second indicators. For instance, in case the original message m has a bit length of 64 bits then the data bus inversion can, e.g., be performed on two halves, each comprising 32 bits. This would require an ECC code that is capable of error protecting messages having a length of 66 bits. Such an ECC code is, e.g., an extended Hamming code H(256,247,9).

Let us express the original message m as a vector of two halves $m_1$, $m_2$, each one being 32 bits long, i.e. $m=(m_2,m_1)$. Let $c_{12}$ and $c_{22}$ be the predefined second checksums belonging to the two inversion possibilities, which can be obtained based on:

$$(1_{(32)},0_{(32)},1,0) \cdot G = (1_{(32)},0_{(32)},1,0,c_{12}), \quad (5)$$

$$(0_{(32)},1_{(32)},0,1) \cdot G = (0_{(32)},1_{(32)},0,1,c_{22}), \quad (6)$$

with $1_{(32)}$ being a 32-bit vector made of all ones and $0_{(32)}$ being a 32-bit vector made of all zeros.

Let now $b_1, b_2 \in \{0,1\}$ be the inversion signaling bits of the two 32-bit original message word halves. According to an embodiment of the present invention the algorithm for obtaining the corresponding transmit signal t can be, e.g., performed as follows.

Firstly, calculate the first check information or checksum $c_1$ of the original message m based on (m,0,0)*G. Calculate, temporarily in parallel, the inversion signaling bits $b_1$ and $b_2$ based on $m_1$ and $m_2$. Then, send the transmit signal:

$$t=(m \oplus (b_1 \cdot 1_{(32)}, b_2 \cdot 1_{(32)}), b_1, b_2, c_1 \oplus b_1 \cdot c_{12} \oplus b_2 \cdot c_{22}). \quad (7)$$

Note, that $m \oplus (b_1 \cdot 1_{(32)}, b_2 \cdot 1_{(32)})$ means a simple inversion of the bits of the original message m and $c_1 \oplus b_1 \cdot c_{12} \oplus b_2 \cdot c_{22}$ is a modulo-2 addition which can be implemented as pure combinatorial logic and does not require any carry chain. A modulo-2 addition can, e.g., be easily realized by an application of an XOR-gate.

Figure 6:
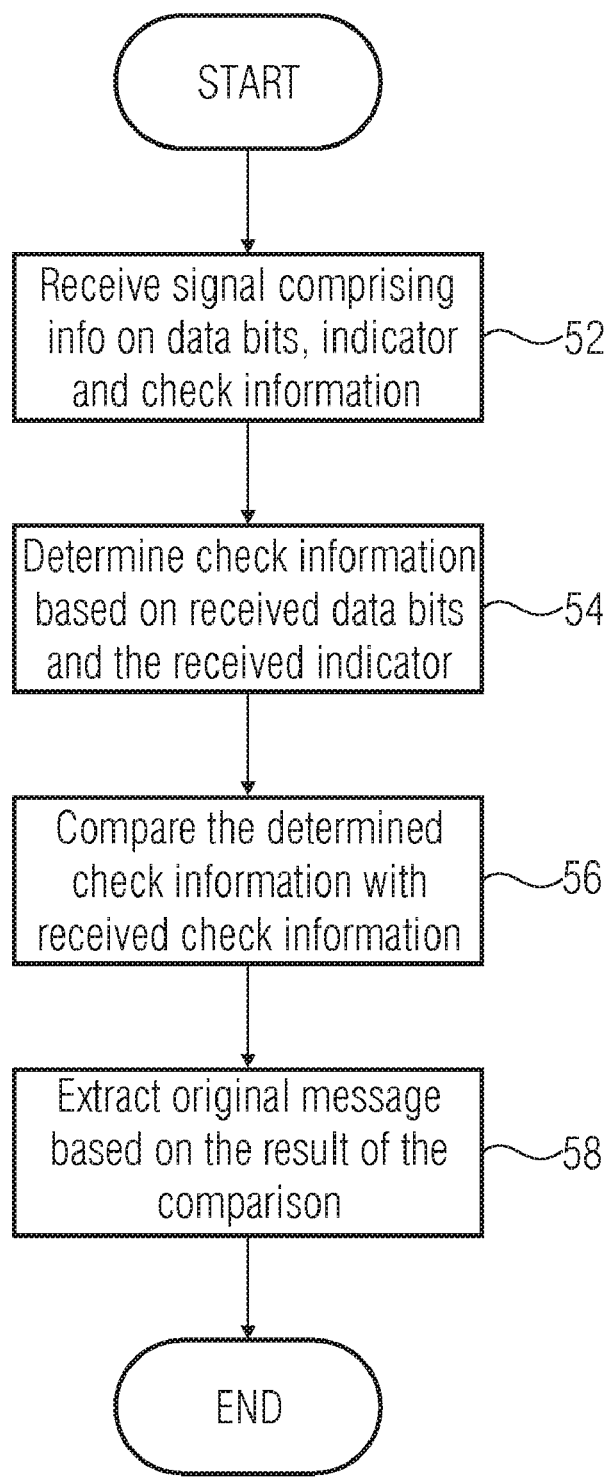
FIG. 6 shows a flow chart of a method for extracting an original message from a received signal according to an embodiment of the present invention.

After having described the principle of some embodiments of encoders for a data bit inversion with ECC, it shall be mentioned that further embodiments also provide concepts for extracting the original message m from an encoded received signal comprising the data bits d representing the original message m or an inverted version thereof, the indicator b indicating whether the data bits d represent the original message m or the inverted version thereof, and the check information c which depends on the data bits d and the indicator b. A flow chart related to a method for extracting the original message m from a received signal is depicted in FIG. 6.

In a first step 52 a signal comprising information on the data bits d, the indicator b and the check information c is received. In the following step 54 check information based on the received data bits d and the received indicator b is determined. In a further step 56 the determined check information is compared with the received check information, such that error correction and/or error detection can be performed in order to extract the original message m based on the result of the comparison in a step 58.

Assuming a single bit indicator, i.e., b=b, the determination of the check information c' can be performed based on:

$$(d,b) \cdot H = (d,b,c'), \quad (8)$$

wherein H denotes the parity-check matrix related to the code generator matrix G and c' denotes the determined check information.

Figure 7:
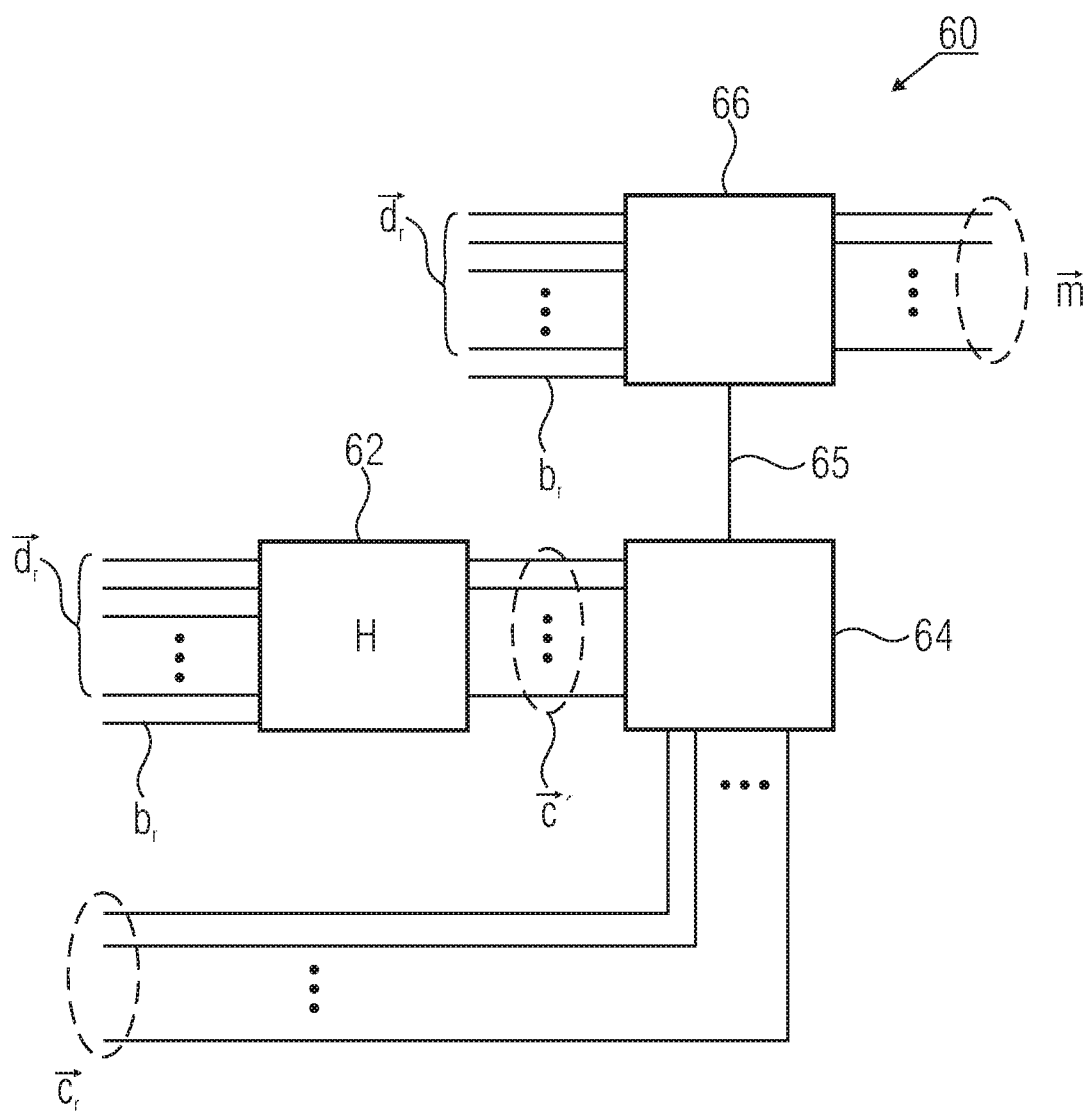
FIG. 7 shows a block diagram of an apparatus for extracting an original message from a received signal according to an embodiment of the present invention.

FIG. 7 shows a schematic block diagram of an apparatus for performing the method described referring to FIG. 6.

The apparatus 60 comprises a processor 62 for determining the check information c' based on the received data bits d and the received indicator b. According to embodiments of the present invention the processor 62 is configured to compute the check information c' based on equation (8).

Further, the apparatus 60 comprises a circuit 64 for comparing the determined check information c' with the received check information C to obtain information 65 based on which error detection and/or correction can be performed. To extract the original message m the apparatus 60 further comprises the circuit 66, which extracts the original message m based on the result 65 of the comparison and the received signal comprising the received data bits and the received indicator b. With the result 65 the received signal can be error corrected. Based on the error corrected received signal, the original message m can then easily be derived regarding the error corrected inversion signaling bit b.

Embodiments of the present invention can, e.g., be applied for burst communication in memory interfaces in order to avoid the necessity of additional signals for bit inversion signaling, avoiding the decoding of the inversion signaling bit b in the SDRAM or the storage of the additional inversion signaling bits. By encoding larger blocks of data, i.e., larger message words, less redundancy is needed for error detection and correction. The freed bits can be used for signaling the data bus inversion. Moreover, the encoded data is written within a burst in a well defined order and is read back in the same order or with a finite number of permutations. This can be exploited in order to compute the bus inversion at a memory controller only, making possible the use of industry standard SDRAMS.

Substantial modifications of main stream DRAM components can be avoided by reusing the already present redundancy for error protection and detection. In main memory interfaces, e.g., for servers, ECC bits are added. For example, in a 64-bit interface 8 additional ECC bits are sufficient to implement an extended Hamming code capable of correcting single errors and detecting double errors. Hence, communication to a main memory is usually done in bursts of 4 or 8 memory words of 72 bits each, 64 bits of data and 8 bits for ECC.

Referring now to FIG. 8 two tables of the burst structures for a burst length of 4 and 8, respectively, are shown.

Burst mode operation is used to provide a constant flow of data to memory locations in write cycles or from memory locations in read cycles. Parameters that define how the burst mode will operate are, e.g., burst sequence and burst length. DDR2 SDRAM supports bursts with a burst length of 4 and bursts with a burst length of 8 only. The ordering of the burst, however, depends on the requested address, and the configured burst type option: sequential or interleaved. Typically, a memory controller will require one or the other.

When the burst length is 1 or 2, the burst type does not matter. For a burst length of 1, the requested word is the only word accessed. For a burst length of 2, the requested word is accessed first, and the other word in the aligned block is accessed second. This is the following word if an even address was specified, and the previous word if an odd address was specified. For the sequential burst mode, later words are accessed in increasing address order, wrapping back to the start of the block when the end is reached. So, for example, for a burst length of 4, and a requested column address of 5, the words would be accessed in the order 5-6-7-4. If the burst length were 8, the access order would be 5-6-7-0-1-2-3-4. This is done by adding a counter to the column address, and ignoring carries past the burst length. The interleaved burst mode computes the address using an exclusive "or" operation between the counter and the address. Using the same starting address of 5, a 4-word burst would return words in the order 5-4-7-6. An 8-word burst would be 5-4-7-6-1-0-3-2.

Regarding a burst with a burst length of 4, data bus inversion can lead to minimizing the state transitions of bus lines between the first and second message word of the burst, the second and third message word and the third and fourth message word of the burst. When the first word of a burst is sent, the bus lines of the data bus are in high impedance mode, respectively, i.e. floating at mid potential. Therefore, any bit to be transmitted over the bus line will lead to the same IO power consumption for the first message word of the burst. Hence, minimizing state transitions of bus lines between the last message word of a burst and the first message word of a succeeding burst is not possible.

When performing the data bus inversion of a burst of length 4, the following algorithm is applied. Firstly, send the data belonging to the first message word to be sent within the burst. In a second step, starting from the second burst, compare the message belonging to the current burst with the message belonging to the preceding burst and, if needed, perform the data bus inversion. Thirdly, send data. Fourthly, repeat from second step until data to be sent belongs to the last message word of the burst.

For a burst length of 8 the algorithm is modified as described in the following paragraphs.

Firstly, for the first or fourth burst, send the data belonging to the first or fourth message word. In a second step, compare the message belonging to the current burst to be sent with the message belonging to the preceding burst and, if needed, perform the data bus inversion. Thirdly, send data. Fourthly, repeat from first step until data to be sent belongs to the last message word of the burst.

In order to combine data bus inversion with error protection, without requiring additional pins for bus inversion signaling, the burst structure is modified according to an embodiment. Memory words of 64 bits are logically grouped in pairs and the check information or the ECC word is hence computed over 128 data bits. The code length is augmented, so less redundancy is needed. The freed bits are used for bit inversion signaling. The burst of data to be read from or written to the memory can be organized in a frame with an organization as depicted in the table shown in FIG. 9.

FIG. 9 shows an example of a frame organization for a burst length of 4. A frame for a burst length of 8 can be obtained by simple repetition of the depicted structure.

The frame is made up of 4 bursts, each burst comprising 72 bits. The frame can be logically grouped into two pairs of bursts as the ECC coding will be computed over two successive memory words collectively comprising 128 bits (64 bits each). The ECC bits protecting the inversion signaling bits can be obtained with a Hamming code using concepts according to embodiments of the present invention described before. In order to achieve error correction and error detection capabilities of the modified ECC code comparable to current industry standard, parity bits are added.

According to an embodiment, the ECC code is modified by encoding two 64 bit messages as a 128 bit message. In order to have single error correction and double error detection e.g. the Hamming (255,247) code can be used. Therefore, 8 redundancy bits are sufficient to correct single errors on 247 bit long messages. With the data structure according to an embodiment, each 72 bit memory word carries 64 data bits, 4 bits of ECC (half of the total 8-bit ECC word), 3 bits for bus inversion signaling and one parity bit.

Hence, for embodiments of the present invention the apparatus 20 is configured to determine the checksum based on first data bits, at least one first indicator, second data bits and at least one second indicator indicating whether the second data bits represent an original second message or an inverted version thereof, wherein said second data bits and said at least one second indicator are part of a second transmit signal to be transmitted in a second burst via the plurality of channels prior to or after the first transmit signal transmitted in the first burst. According to embodiments, the apparatus 20 is configured to form the first transmit signal including a first portion of the checksum and to form the second transmit signal including a second portion of the checksum.

In order to compute the 8-bit first check information or the ECC word $c_1$, the original 128 bit message $m=(m_1,m_2)$, where $m_1$, $m_2$ are the two 64 bit message words to be successively transmitted, is first augmented with 119 zeros in order to reach a correct size, i.e., 247 bits. Let G be the generator matrix of the Hamming (255,247) code, and let us consider G in the canonical form. Then, the first check information $c_1$ can be obtained based on:

$$(m_1,m_2,0_{(119)}) \cdot G = (m_1,m_2,0_{(119)},c_1), \quad (9)$$

with $c_1$ comprising the 8 check bits.

The bus inversion is performed on each half of the vector $m=(m_1,m_2)$ in, e.g., three chunks of respectively 22, 22 and 20 bits, as 64 is not a multiple of 3. Of course these numbers are only exemplary numbers and further embodiments of the present invention are not limited to the examples given in this specification. To each inversion signaling bit $b_{1,1}$, $b_{1,2}$, $b_{1,3}$ ($b_{2,1}$, $b_{2,2}$, $b_{2,3}$) is associated the chunk of the vector $m_1$ ($m_2$) obtained by calculating the check bits of the vector having ones in the positions that have to be inverted, a one in the relative check bit position, and zeros elsewhere. For instance, if the first inversion signaling bit $b_{1,1}$ is related to the first 22 bits of $m_1$, then the related second check information $c_{12}$ can be obtained based on:

$$h_{1,1}=(1_{(22)},0_{(106)},1,0_{(118)}) \cdot G = (1_{(22)},0_{(106)},1,0_{(118)},c_{1,1}) \quad (10)$$

where $1_{(n)}$ is a n-bit long all-ones vector and $0_{(n)}$ is a n-bit long all-zeros vector.

If the second inversion signaling bit $b_{1,2}$ is related to the second chunk of 21 bits of $m_1$, then the related second check information $c_{22}$ can be obtained based on:

$$h_{1,2}=(0_{(22)},1_{(21)},0_{(86)},1,0_{(117)}) \cdot G = (0_{(22)},1_{(21)},0_{(86)}, 1,0_{(117)},c_{1,2}). \quad (11)$$

If the third inversion signaling bit $b_{1,3}$ is related to the third chunk of 21 bits of $m_1$, then the related second check information $c_{32}$ can be obtained based on:

$$h_{1,3}=(0_{(43)},1_{(21)},1_{(66)},0_{(116)}) \cdot G = (0_{(43)},1_{(21)},1_{(66)}, 1,0_{(116)},c_{1,3}). \quad (12)$$

$h_{2,1}$, $h_{2,2}$ and $h_{2,3}$ can be obtained similarly related to the inversion signaling bits $b2,1$, $b2,2$ and $b2,3$ related to the first, second and third chunk of $m2$, respectively. The transmit word can, e.g., be obtained based on:

$$t = (m_1, m_2, 0_{(119)}, c_1) \oplus \sum_{j=1}^{3} \sum_{i=1}^{i=3} b_{i,j} h_{i,j}, \quad (13)$$

wherein $\Sigma$ denotes a modulo-2 sum.

Of course the transmit word t could also have a different bit ordering according to further embodiments. This would then also affect the bit ordering of $h_{i,j}$. In any case, the check information c of the transmit word t can be computed according to $$c = \sum_{j=1}^{3} \sum_{i=1}^{i=3} b_{i,j} c_{i,j},$$

wherein Σ denotes a modulo-2 sum.

According to an embodiment, extra parity bits are added to the transmit signal t in order to detect double errors. This can be done on each burst of the frame, a burst comprising 64 bits of data, 4 check bits (the actual checksum of 8 bits is split among 2 subsequent bursts), and the three inversion signaling bits. The parity bit of the first burst can be, e.g., computed according to:

$$p_1 = \sum (m_1, g_1) \oplus \sum_{j=1}^{j=3} b_{1,j} \sum g_{1,j}, \quad (14)$$

where $g_1$ is the vector comprising half of the check bits of the first check information $c_1$, $g_{1,j}$ is the vector comprising half of the check bits $c_{1,j}$, and $b_{1,j}$ are the actual values of the bus inversion signaling bits. All additions are intended to be modulo 2. Please also note that all the values $\Sigma g_{1,j}$ can be pre-calculated and the adjustment can be implemented with XOR-gates, as the effect will be just inverting or not the parity value $\Sigma(m_1, g_1)$.

An algorithm according to an embodiment for building the data burst can be summarized as follows. Group $m_1$ and $m_2$ in a 128-bit long vector and calculate the first check information $c_1$ according to equation (9). Calculate the parity bits $p_1$ and $p_2$ over $(m_1, g_1)$ and $(m_2, g_2)$, respectively. Calculate, temporarily in parallel to the previous steps, the inversion bit vectors $b_1 = (b_{1,1}, b_{1,2}, b_{1,3})$ and $b_2 = (b_{2,1}, b_{2,2}, b_{2,3})$. Determine the transmit word t according to equation (13) and perform a parity bit adjustment based on equation (14). Insert the parity bits $p_1$ and $p_2$ into transmit word t. Then, divide the transmit word t into two transmit words $t_1$ and $t_2$, each comprising 64 data bits representing the respective original message or an inverted version thereof, 4 check bits (half of the actual check information), three inversion signaling bits and one parity bit, and send $t_1$ and $t_2$ over two consecutive bursts. Then, repeat the above steps for $m_3$ and $m_4$.

Of course the above presented algorithm can be modified according to further embodiments.

The actual format of the data packets to be transmitted in burst mode of burst length 4 is shown in FIG. 10. $b_i = (b_{i,1}, b_{i,2}, b_{i,3})$ are 3-bit long vectors comprising all the inversion signaling bits relevant to one of the columns of the packet. As mentioned before, data bus inversion can lead to minimizing the state transitions of bus lines between the all message words within a burst. However, data bus inversion does not lead to minimizing the state transitions of bus lines between the last message word of a first burst and the first message word of a succeeding second burst, since the bus lines of the data bus are in high impedance mode, respectively, i.e., floating at mid potential, when the first word of a burst is sent. This can be exploited for design optimization and for in-band transmission of additional information.

The additional parity bits $p_i$ are used in order to detect multiple errors. The decoding scheme for $m_1$ and $m_2$ is summarized in the table shown in FIG. 11, where s is the syndrome, e.g., calculated based on $(m_1', m_2', c', b_1, b_2, 0_{(113)}) \cdot H^T$, wherein $m_1'$, $m_2'$ are the received bus-inversion encoded form of $m_1$, $m_2$. c' is the received check information or checksum adjusted for bus inversion as described above. $b_1$, $b_2$, are the vectors carrying the bus-inversion signaling bits and $H^T$ is the transposed form of the parity check matrix of the Hamming (255,247) code. The fact that the last 113 bits are equal to zero can be exploited for obvious implementation optimizations.

Embodiments of the present invention may recover the original message words $m_1$ and $m_2$ if a single error occurred during the transmission of the two columns of the burst. Also, embodiments of the present invention may detect errors of even weight on the two columns of the burst. However, errors of odd weight greater than 1 on the two columns are not detected (i.e., an erroneous decoding will happen if 3 or more errors of even weight will occur during the transmission of the two columns).

To summarize, embodiments described herein relate to a novel combination of encoding for low power and error protection, which makes it possible to use the bus-invert technique in the presence of errors without any compromise on overall system reliability. Embodiments of the present invention modify an ECC coding and exploit burst communication in memory interfaces in order to reduce an encoding-decoding overhead. Moreover, embodiments of the present invention allow the use of industry standard memories avoiding the system cost increase due to specialized DRAMs. According to embodiments, a memory controller generates a transmit signal including data bits, an indicator indicating whether the data bits represent an original message or an inverted version thereof and further including at least part of a check information. Then the memory controller transmits the transmit signal to standard memory components, where the content of the transmit signal can be stored. In case of a read access, the stored transmit signal is transferred back from the standard memory components to the memory controller. The memory controller receives the transferred signal and the original message can be extracted from the received signal.

Hence, a further embodiment of the present invention also comprises a system, the system comprising a memory component for storing a signal comprising data bits and a memory controller for generating and receiving the signal. The memory component could be a standard DRAM component. According to embodiments the memory controller comprises a circuit for providing an indicator indicating whether the data bits represent an original message or an inverted version thereof, a processor for determining check information which depends on the data bits and the indicator, and a transmitter for transmitting the signal to the memory component, the signal including the data bits, the indicator and at least a part of the check information. The memory controller further comprises an extractor for extracting the original message from a received version of the signal received from the memory component, the extractor comprising a processor for determining a check information based on the received data bits and the received indicator, a circuit for comparing the determined check information with the received check information, and a circuit for extracting the original message based on the result of the comparison.

Depending on the circumstances, the inventive method may be implemented in hardware or in software. The implementation may be done on a digital storage medium, particularly a disk, a DVD or a CD with electronically readable control signals, which may cooperate with a programmable computer system so that the method is executed. In general the invention does also consist in a computer program product with a program code stored on a machine-readable carrier performing the inventive method, when the computer program runs on a computer. In other words, the invention may thus be realized as a computer program with a program code for performing the method when the computer program runs on a computer.

While this invention has been described in terms of several preferred embodiments, there are alterations, permutations and equivalents which fall within the scope of this invention. It should be also noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An apparatus for generating a transmit signal comprising data bits, the apparatus comprising:
   a circuit for providing an indicator indicating whether the data bits represent an original message or an inverted version thereof;
   a processor for determining check information that depends on the data bits and the indicator; and
   a circuit for forming the transmit signal including the data bits, the indicator and at least a part of the check information.

2. The apparatus according to claim 1, wherein the processor is further configured to determine a first check information assuming a first state of the indicator and to modify the first check information using a second check information if an actual state of the indicator is different from the first state.

3. The apparatus according to claim 2, wherein the processor is further configured to determine the first check information temporally in parallel to providing the indicator.

4. The apparatus according to claim 2, wherein the processor is further configured to modify the first check information based on a modulo-2 addition of the first check information and the second check information.

5. The apparatus according to claim 2, wherein the first and second check information comprise a first checksum and a second checksum, each checksum comprising error-correcting bits.

6. The apparatus according to claim 5, wherein the processor is further configured to determine the first checksum by extending the original message by at least one bit value indicating no inversion to obtain an extended original message, and by multiplying the extended original signal message by a code generator matrix.

7. The apparatus according to claim 5, wherein the processor is further configured to form the second checksum by multiplying an all-ones-vector, having a length at least equal to a word length of the original message plus one, by a code generator matrix.

8. The apparatus according to claim 5, wherein each check information is a checksum and wherein the processor is configured to determine the checksum based on $$c = c_1 \oplus c_2 \cdot b,$$

wherein c is the checksum, $c_1$ denotes the first checksum, $c_2$ denotes the second checksum, b denotes the indicator and $\oplus$ denotes a modulo-2 addition.

9. The apparatus according to claim 1, wherein the check information is a checksum, wherein the apparatus is capable of being coupled to a plurality of channels via which the data bits of the transmit signal are to be transmitted simultaneously in parallel, wherein the circuit for providing an indicator is configured to provide a first indicator for a first portion of the data bits and to provide a second indicator for a second portion of the data bits, and wherein the processor is configured to determine the checksum based on the data bits and the first and second indicators.

10. The apparatus according to claim 1, wherein the check information is a checksum, wherein the apparatus is capable of being coupled to a plurality of channels via which the data bits of the transmit signal are to be transmitted simultaneously in parallel, wherein the processor is configured to determine the checksum based on the data bits, the indicator, additional data bits and an additional indicator indicating whether the additional data bits represent an original additional message or an inverted version thereof, wherein the additional data bits and the additional indicator are part of an additional transmit signal to be transmitted via the plurality of channels prior to or after the transmit signal, and wherein the circuit for forming the transmit signal is configured to form the transmit signal including a first portion of the checksum and to form the additional transmit signal including a second portion of the checksum.

11. The apparatus according to claim 1, wherein the check information is a parity bit, wherein the processor is configured to determine the parity bit using the data bits and a checksum, the checksum depending on the data bits and the indicator.

12. An apparatus for extracting an original message from a received signal carrying information on data bits representing the original message or an inverted version thereof, an indicator indicating whether the data bits represent the original message or the inverted version thereof, and a check information which depends on the data bits and the indicator, the apparatus being comprising:
   a processor for determining a check information based on the received data bits and a received indicator;
   a circuit for comparing the determined check information with received check information; and
   a circuit for extracting the original message based on the result of the comparison.

13. The apparatus according to claim 12, wherein the processor is further configured to multiply at least received data bits and the received indicator with a parity-check matrix to determine the check information.

14. An apparatus for generating a transmit signal comprising data bits, the apparatus comprising:
   a circuit for providing an indicator indicating whether the data bits represent an original message or an inverted version thereof;
   a processor for determining a check information, wherein the check information is equal to a first check information when the indicator indicates that the data bits represent the original message and the check information is equal to the first check information modified by a second check information when in case the indicator indicates that the data bits represent the inverted version of the original message; and
   a circuit for forming the transmit signal including the data bits, the indicator and the check information.

15. The apparatus according to claim 14, wherein the processor is further configured to determine the first check information temporally in parallel to providing the indicator.

16. The apparatus according to claim 14, wherein the processor is further configured to modify the first check information based on a modulo-2 addition of the first check information and the second check information.

17. The apparatus according to claim 14, wherein the first and second check information comprise a first checksum and a second checksum, each checksum comprising error-correcting bits.

18. The apparatus according to claim 17, wherein the processor is further configured to determine the first checksum by extending the original message by at least one bit value indicating no inversion to obtain an extended original message, and by multiplying the extended original signal message by a code generator matrix.

19. The apparatus according to claim 17, wherein the processor is further configured to form the second checksum by multiplying an all-ones-vector, having a length at least equal to a word length of the original message plus one, by a code generator matrix.

20. The apparatus according to claim 17, wherein the check information is a checksum and wherein the apparatus processor is configured to determine the checksum based on $$c = c_1 \oplus c_2 \cdot b,$$

wherein c is the checksum, $c_1$ denotes the first checksum, $c_2$ denotes the second checksum, b denotes the indicator and $\oplus$ denotes a modulo-2 addition.

21. The apparatus according to claim 14, wherein the check information is a checksum, wherein the apparatus is capable of being coupled to a plurality of channels via which the data bits of the transmit signal are to be transmitted simultaneously in parallel, wherein the circuit for providing an indicator is configured to provide a first indicator for a first portion of the data bits and to provide a second indicator for a second portion of the data bits, and wherein the processor is configured to determine the checksum based on the data bits and the first and second indicators.

22. The apparatus according to claim 14, wherein the check information is a checksum, wherein the apparatus is capable of being coupled to a plurality of channels via which the data bits of the transmit signal are to be transmitted simultaneously in parallel, wherein the processor is configured to determine the checksum based on the data bits, the indicator, additional data bits and an additional indicator indicating whether the additional data bits represent an original additional message or an inverted version thereof, wherein the additional data bits and the additional indicator are part of an additional transmit signal to be transmitted via the plurality of channels prior to or after the transmit signal, and wherein the circuit for forming the transmit signal is configured to form the transmit signal including a first portion of the checksum and to form the additional transmit signal including a second portion of the checksum.

23. The apparatus according to claim 14, wherein the check information is a parity bit, wherein the processor is configured to determine the parity bit using the data bits and a checksum, the checksum depending on the data bits and the indicator.

24. A method for generating a transmit signal comprising data bits, the method comprising:
providing an indicator indicating whether the data bits represent an original message or an inverted version thereof;
determining check information which depends on the data bits and the indicator; and
forming the transmit signal including the data bits, the indicator and at least a part of the check information.

25. A method for extracting an original message from a received signal comprising data bits representing the original message or an inverted version thereof, an indicator indicating whether the data bits represent the original message or the inverted version thereof, and a check information which depends on the data bits and the indicator, the method comprising:
determining a check information based on the received data bits and the received indicator;
comparing the determined check information with the received check information; and
extracting the original message based on the result of the comparison.

* * * * *